March 22, 1949.　　　A. E. COLOSIMO　　　2,465,064
FISHING LURE
Filed May 5, 1945

INVENTOR.
Antone C. Colosimo
BY Edward C. Healy
ATTORNEY

Patented Mar. 22, 1949

2,465,064

UNITED STATES PATENT OFFICE 2,465,064

FISHING LURE

Antone C. Colosimo, San Francisco, Calif.

Application May 5, 1945, Serial No. 592,107

1 Claim. (Cl. 43—42)

This invention relates to improvements in fishing lures or plugs and has particular reference to novel means embodied in the device for securing the fish hooks and the leader thereto.

The principal object of the invention is the provision of a simplified construction made of plastic material that comprises an unique fish hook retaining plastic section and an adapter, likewise made of plastic, for said section, and means for securing the two sections together, said adapter being equipped with means for securing a leader thereto to effect a swivel action of the leader relative to the adapter.

A further object of the invention is the provision of a device of the character described that is economical to manufacture, positive in operation, strong, durable, and highly efficient in use, and a device that may be readily assembled and disassembled.

Other objects and advantages will be apparent during the course of the following description.

Figure 1:
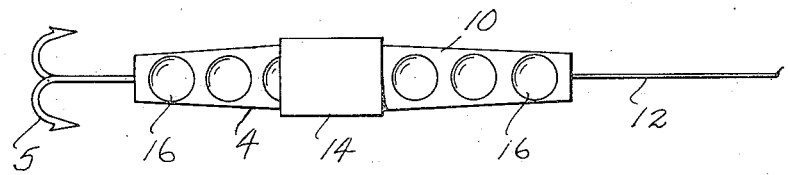
Figure 2:
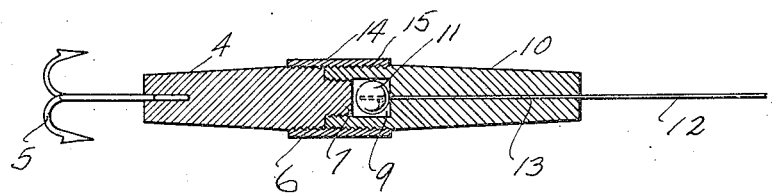
Figure 3:
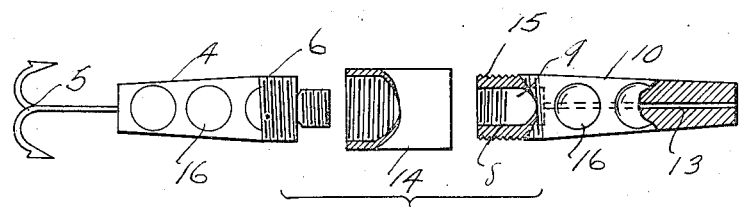

In the accompanying drawing wherein for the purpose of illustration is shown the preferred embodiment of the invention, Fig. 1 is a side elevation of the device constructed in accordance with my invention, Fig. 2 is a longitudinal section of the same, the hooks and ball element being shown in elevation, and Fig. 3 is a view partly in elevation and partly in section disclosing the parts of the same as disassembled.

In the accompanying drawing wherein for the purpose of illustration is shown the features of the invention, the numeral 4 indicates a cone-shaped plastic section that receives in its outer end the shank of a plurality of fish hooks 5. It will be noted that said section is of a tapered configuration throughout the greater portion of its length and is equipped with external threads 6 adjacent its inner wall. An externally threaded extension 7 of a smaller diameter than that of said section 4 projects from the inner wall of said cone-shaped section and is received in a bore 8 of the adapter portion of the device, the bore being partly threaded and providing a chamber 9 in back of said threaded portion. The adapter as a whole is indicated by the numeral 10 and serves to receive therein for threaded engagement the extension 7. In said chamber 9 a ball 11 is received and to said ball there is connected one end of a leader 12, the leader in turn being trained through a restricted bore 13 that extends the length of said adapter and is in communication at its outer end with a fish line (not disclosed).

It will be obvious that by virtue of the construction devised the ball 11 positioned in the chamber will have a swivel action under the influence of the leader.

As illustrated to advantage in Figs. 2 and 3, I have disclosed an internally threaded sleeve 14 that serves as a means for holding the hook-holding section 4 and the adapter portion 10 in fixed engagement and eliminates danger of displacement of these elements one from the other, should said parts have the tendency to turn or twist. External threads 15 provided on the inner end of the adapter cooperate with the external threads 6 of the section 4 to assure threaded engagement of the sleeve element with the section 4 and said adapter.

The numeral 16 indicates a plurality of circular recesses formed in both the section 4 and the adapter 10, which recesses are preferably highly ornamented with a bright color, such as red, to make the device a more attractive fishing lure.

I propose to introduce to the trade a fish hook holding section as an individual unit, each unit carrying various sizes of fish hooks; and to further provide a separate adapter that will be universally adaptable to the fish hook holding section, irrespective of the sizes of the fish hooks that are required. Accordingly, a purchaser can always have available the adapter unit that will comprise the sleeve portion and the adapter per se. Should breakage of the fish hook occur at any time, new fish hook sections can be readily and economically purchased and readily fitted to the adapter construction, as illustrated in Figs. 2 and 3 of the drawing.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:

A device of the character described comprising a cone-shaped plastic section recessed for ornamentation and having a plurality of fish hooks fixedly secured in one end thereof, said section being externally threaded adjacent its opposite end, an externally threaded extension formed on the opposite end and of a smaller diameter than said section, a cone-shaped plastic adapter section recessed for ornamentation and having a longitudinal bore therein, a chamber provided in the inner end of said adapter and communicating with the bore, said chamber being internally threaded throughout a portion of its length for engaging the external threads of said extension, a ball normally positioned in the unthreaded portion of said chamber for swivel movement therein, a leader secured to said ball and extending through the bore of said adapter section, external threads provided on the inner end of said adapter section, and a sleeve having internal threads for engaging the external threads of said plastic section and the external threads of said adapter section.

ANTONE C. COLOSIMO.

REFERENCES CITED

The following references are of record in the file of this patent:

UNITED STATES PATENTS

| Number | Name | Date |
|---|---|---|
| 1,068,144 | Lawler et al. | July 22, 1913 |
| 1,670,185 | Bond | May 15, 1928 |
| 1,858,550 | Kahle | May 17, 1932 |